UNITED STATES PATENT OFFICE.

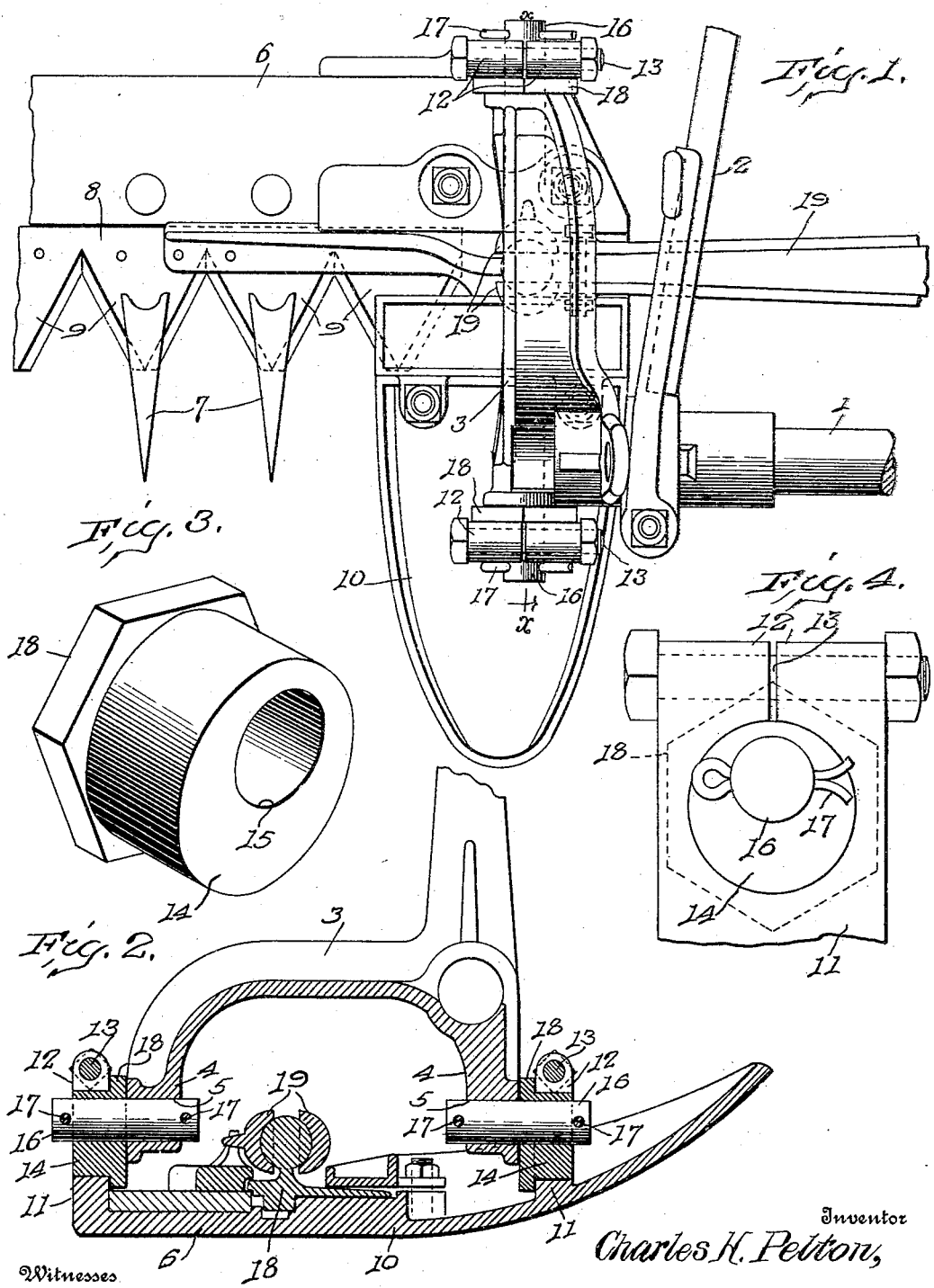

CHARLES H. PELTON, OF SPRINGFIELD, OHIO, ASSIGNOR TO THE THOMAS MANUFACTURING COMPANY, OF SPRINGFIELD, OHIO, A CORPORATION OF OHIO.

MOWING-MACHINE.

943,266.  Specification of Letters Patent.  Patented Dec. 14, 1909.

Application filed November 12, 1908. Serial No. 462,198.

*To all whom it may concern:*

Be it known that I, CHARLES H. PELTON, a citizen of the United States, residing at Springfield, in the county of Clark and State of Ohio, have invented certain new and useful Improvements in Mowing - Machines, of which the following is a specification, reference being had therein to the accompanying drawings.

This invention relates to mowing machines, and more particularly to the cutting mechanism thereof.

The object of the invention is to provide a cutting mechanism for a machine of this character in which the finger bar can be adjusted to maintain the same in the desired relation to the frame of the machine and to the actuating mechanism for the knife; in which the finger bar can be adjusted relatively to the knife to maintain the desired relation between the blades of the knife and the guards of the finger bar when the knife is in a predetermined position; and to provide one mechanism for accomplishing both of these adjustments.

To this end it is a further object of the invention to so connect the finger bar to the supporting frame that the outer end thereof can be moved forwardly or rearwardly relatively to the inner end thereof; and also to so mount the finger bar that the finger bar as a whole may be moved toward or away from the supporting frame, to which frame the knife is connected.

It is a further object of the invention to provide such a mechanism which will be strong and durable and the arrangement of which will be compact, thus accomplishing the desired results without in any way diminishing the efficiency or mechanical appearance of the machine.

With these objects in view my invention consists in certain novel features and certain combinations and arrangements of parts hereinafter to be described, and then more particularly pointed out in the claims.

In the accompanying drawings, Figure 1 is a top plan view of a portion of a moving machine showing my invention applied thereto; Fig. 2 is a transverse, sectional view thereof, taken on the line *x x* of Fig. 1 and looking in the direction of the arrow; Fig. 3 is a detail view of the eccentric bearing block; and Fig. 4 is a detail view of one of the bearings.

In these drawings I have illustrated one embodiment of my invention and have shown the same as applied to a mowing machine of ordinary construction.

As the machine as a whole forms no part of the invention I have shown only so much of the machine as is necessary to illustrate the application of my invention thereto. In the drawings I have shown frame members 1 and 2, by means of which the cutting mechanism proper is supported from the main frame of the machine. These frame members 1 and 2 support at their adjacent ends a yoke 3 having depending arms 4 provided with bearing apertures 5. To this yoke is connected a finger bar 6 provided with the usual fingers or guards 7 and adapted to support the knife 8, the several blades 9 of which coöperate with the fingers or guards 7 in the cutting operation. The finger bar is provided at its inner end with a shoe 10 forming a part thereof and having rigidly secured thereto adjustable bearings, which, in the present instance, are shown as eccentric bearings comprising bearing lugs or split collars 11 carried by the finger bar and provided at their upper ends with apertured ears 12 adapted to receive bolts 13, and each having a large central opening adapted to receive a bearing block 14 which is journaled therein and has an eccentrically arranged bearing aperture 15. The aperture 15 is adapted to receive one end of a pin 16 which extends loosely through the bearing block 14 and the bearing aperture 5 in the adjacent arm 4 of the yoke 3 and is retained therein, preferably by means of cotter pins 17 extending through the ends of the pin 16 which project beyond the arm 4 and split collar 11. Suitable means may be provided for rotating the bearing block 14, and, in the present instance, I have shown this means as comprising a flange 18 shaped to form a wrench grasp and located at the inner end of the bearing block so that it is supported between the split collar or bearing lug 11 and the arm 4 of the yoke. The knife 8 may be operated in any suitable manner and I have here shown the same as provided with a pitman 19 which connects the same with the usual actuating mechanism, which mechanism is supported from the main frame of the machine.

In the operation of a mowing machine of this character it frequently happens, particularly after the machine has been in service for a considerable length of time, that the outer end of the finger bar will be forced back into a position in the rear of the inner end thereof, thus disarranging the finger bar relatively to the supporting frame and its operating pitman and causing the same to extend at an acute rearward angle to the line of draft of the machine. To overcome this difficulty and restore the finger bar to its normal position, the bolt 13 of one of the split collars 11 is loosened and the eccentric bearing block 14 rotated therein in such a manner as to cause the rear bearing lug or split collar 11 to occupy a relative position farther removed from the supporting frame than the position occupied by the other collar 11, thereby causing the outer end of the finger bar to be moved forward a distance sufficient to bring the same into the desired position relatively to the supporting frame and the pitman. The operation of one of the bearing blocks is ordinarily sufficient to accomplish this adjustment, and, for this purpose, it is only necessary to provide a single bearing block, but, in the construction here shown a part of the adjustment may be made on each of the bearing blocks. There is sufficient lost motion in the bearings to permit the pivotal movement of the finger bar, as described, without the necessity of providing any additional means for taking care of this movement. After the adjustment has been accomplished, the bolt 13 in the bearing lug in which the bearing block has been adjusted, is tightened down and the block clamped securely in its adjusted position. The pin 16 being loosely mounted in the bearing block permits the bearing block to be freely moved about the same, and by tightening down the bolt of the split collar 11 this eccentric bearing block can be locked at any point and a very fine adjustment secured. Further, this adjustment may be made at any time or at any place, as it is not necessary to remove or loosen any part of the machinery excepting only the loosening of the bolts in the clamping collars 11, and, consequently, the only tool necessary is a wrench.

It also sometimes happens in the operation of a machine of this character that the blades 9 of the reciprocating knife 8 will fail to properly register with the guards 7 of the finger bar when the knife is in a predetermined position. Under normal conditions the apex of each blade of the knife should, when the knife is at the inner or outer limit of its movement, register with the center of the guard, but, owing to one cause or another, such as a slight variation in the length of the pitman 19 from the pattern, the blades of the knife do not always so register. With the construction of cutting mechanism herein described the normal relative positions of the finger bar and the knife may be restored at any time by loosening the split collars 11 and rotating the eccentric bearing blocks 14 a sufficient distance to move the finger bar inwardly or outwardly a distance sufficient to bring the guards into proper registration with the blades of the knife, which knife is connected to the frame of the machine by the pitman and is held against movement relatively to the finger bar other than its ordinary reciprocating or cutting movement. After this adjustment is secured the bolts 13 are again tightened down and the bearing blocks 14 clamped in their adjusted positions. Therefore, it will be apparent that I have provided in a machine of this character a cutting mechanism in which the relative positions of the finger bar and the knife, when the knife is in a predetermined position, may be controlled; in which the finger bar may be adjusted to maintain the same in its proper relation to the supporting frame and its actuating pitman and in which both of these adjustments are accomplished by a single mechanism; further, that, owing to the fact that both of these adjustments are accomplished by a single mechanism and that this mechanism is of a very simple character, the invention may be applied to a machine without in anywise interfering with the normal operation thereof or materially altering its appearance; and that the invention is of an exceedingly simple character and is very strong and durable and may be applied to a machine at a very low cost.

I have shown and described one particular form of mechanism, by means of which the objects of this invention may be accomplished, but the invention resides broadly in providing a mechanism capable of accomplishing one or both of these adjustments, or, as in the present instance, capable of accomplishing either or both of the adjustments, and it will be apparent that this result may be accomplished by other mechanism than that here shown without departing from the scope of the invention, and I, therefore, wish it to be understood that I do not desire to be limited to the details of construction shown and described, for obvious modifications will occur to a person skilled in the art.

Having thus fully described my invention, what I claim as new and desire to secure by Letters Patent, is:—

1. In a machine of the character described, the combination, with a frame, and a finger bar, of a bearing comprising a split collar carried by one of said members, an eccentric bearing block mounted in said split collar, means for clamping said collar about said bearing block, a part carried by the other of said members and journaled in said bearing block, and a knife adapted to coöperate with said finger bar.

2. In a machine of the character described, the combination, with a frame, and a finger bar, of a pair of bearings carried by said finger bar, each comprising a split collar, a bearing block rotatably mounted in said split collar and having an eccentrically arranged aperture therein, and means for clamping said split collar about said bearing block, a pair of arms supported from said frame, and pins carried by said arms and mounted in the apertures in said bearing blocks, and a knife adapted to coöperate with said finger bar.

3. In a machine of the character described, the combination, with a frame, and a finger bar, of a pair of split bearing lugs carried by said finger bar, a bearing block rotatably mounted in each of said bearing lugs and having an eccentrically arranged aperture therein, means for rotating said bearing blocks, means for clamping said split bearing lugs about said bearing blocks to lock the same against rotation, a pair of arms carried by said frame, pins carried by said arms and journaled in the apertures in said bearing blocks, and a knife adapted to coöperate with said finger bar.

4. In a machine of the character described, the combination, with a frame, and a finger bar, of a pair of bearing lugs carried by said finger bar, a bearing block mounted in each of said lugs and having an eccentrically arranged aperture therein, a pair of arms carried by said frame, pins carried by said arms and loosely mounted in the apertures in said bearing blocks, a flange carried by the inner side of each of said bearing blocks to form a wrench grasp and arranged between said bearing lug and the adjacent arm, and means for locking said bearing blocks against rotation in said lugs.

5. In a machine of the character described, the combination, with a frame, and a finger bar, of an adjustable bearing block carried by one of said members, a pin carried by the other of said members and mounted in said bearing block, a split collar secured to one of said members and extending about said adjustable bearing block, and means for clamping said split collar about said bearing block to lock the same in its adjusted position.

6. In a machine of the character described, the combination, with a frame, and a finger bar, of a pair of eccentric bearing blocks adjustably mounted on said finger bar, a pair of arms carried by said frame, pins carried by said arms and mounted in said eccentric bearing blocks, a pair of split collars secured to said finger bar and extending about the respective bearing blocks, means for clamping said split collars about said bearing blocks to lock the same in their adjusted positions, and a knife adapted to coöperate with said finger bar.

7. In a machine of the character described, the combination, with a frame, and a finger bar, of a pair of bearing lugs carried by said finger bar, a bearing block rotatably mounted in each of said lugs and having an eccentrically arranged aperture therein, a pair of arms carried by said frame, pins carried by said arms and loosely mounted in the apertures in said bearing blocks, flanges carried by the inner sides of said bearing blocks to form wrench grasps and arranged between said bearing lugs and the adjacent arms, and frictional means for locking said bearing blocks against rotation in said bearing lugs.

In testimony whereof, I affix my signature in presence of two witnesses.

CHARLES H. PELTON.

Witnesses:
  ELZA F. McKEE,
  EDWARD L. REED.